(No Model.) 3 Sheets—Sheet 1.
G. WALKER.
APPARATUS FOR MANUFACTURING GAS FROM SAWDUST.
No. 321,868. Patented July 7, 1885.
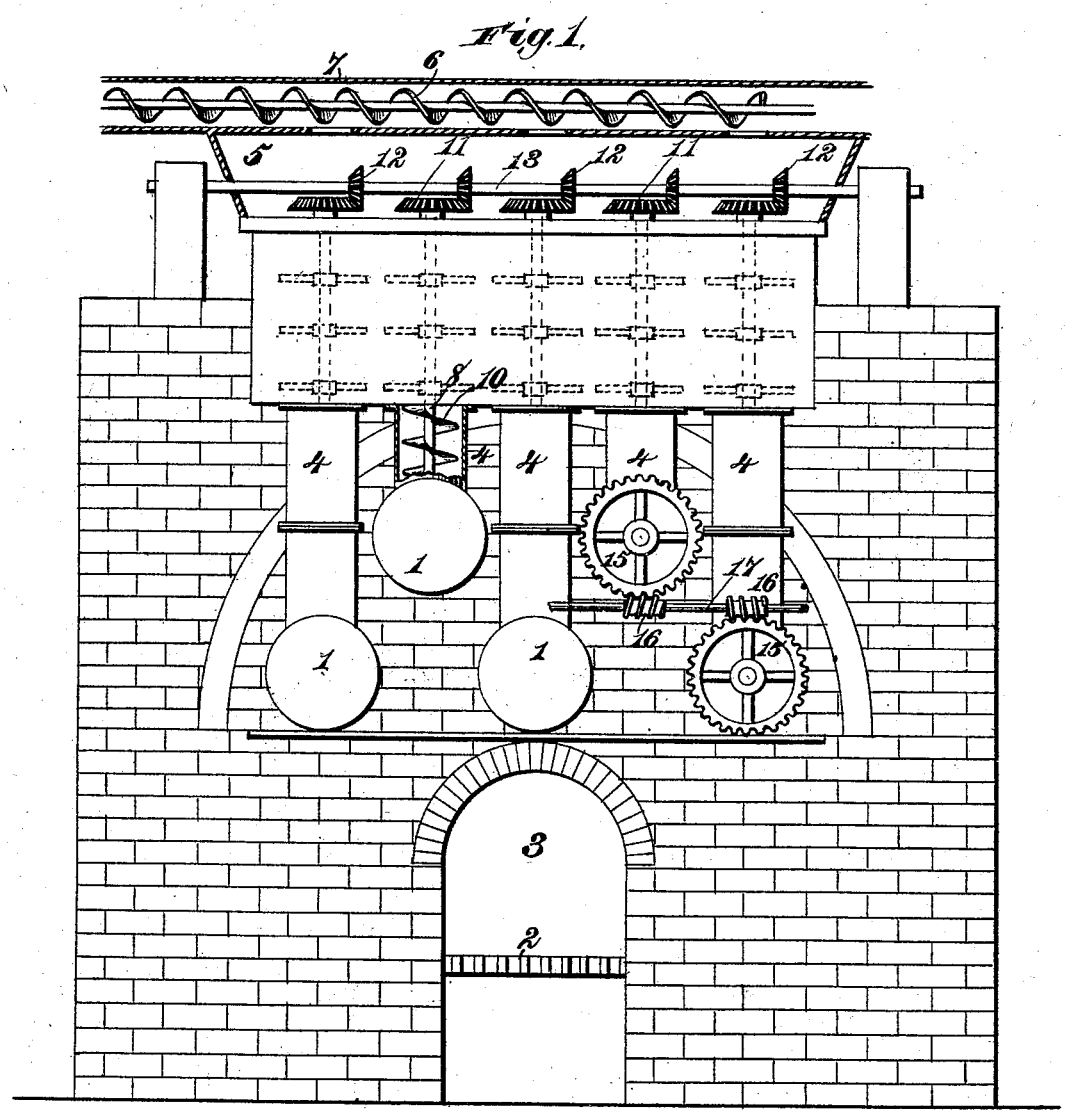

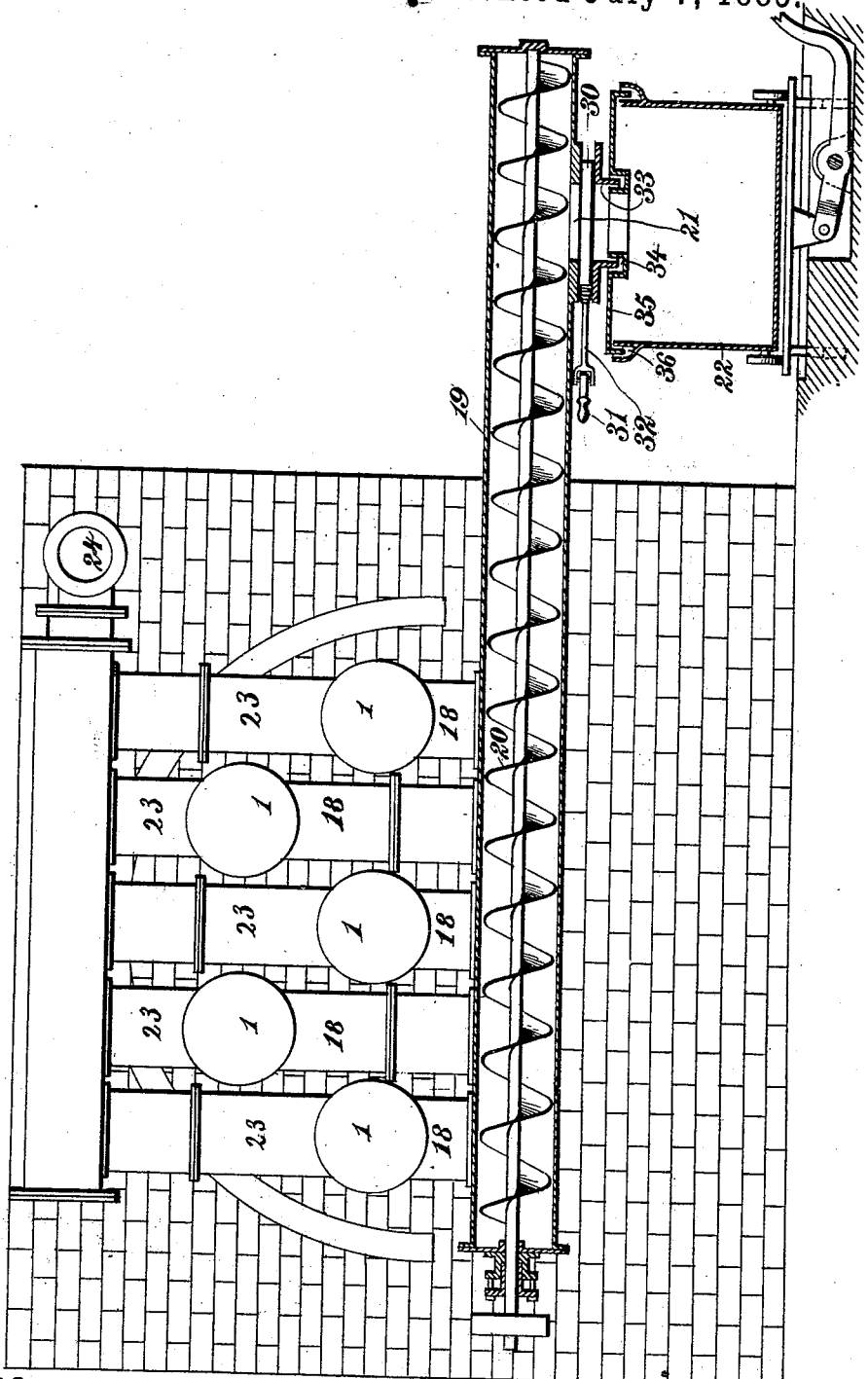

(No Model.)
3 Sheets—Sheet 3.
G. WALKER.
APPARATUS FOR MANUFACTURING GAS FROM SAWDUST.
No. 321,868. Patented July 7, 1885.
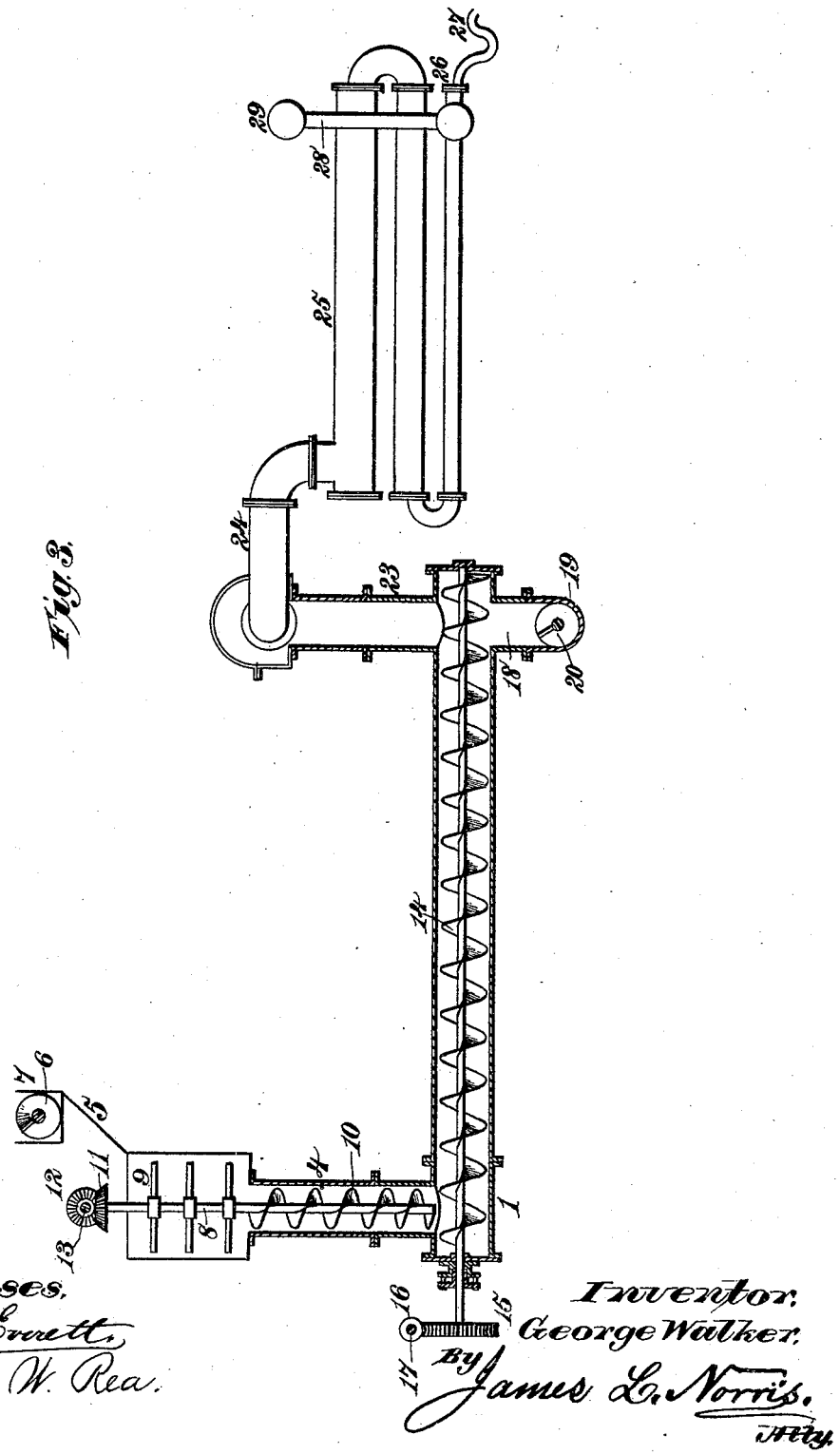
Witnesses,
Robert Everett,
George W. Rea.
Inventor,
George Walker,
By James L. Norris,
Atty.

UNITED STATES PATENT OFFICE.

GEORGE WALKER, OF DESERONTO, CANADA.

APPARATUS FOR MANUFACTURING GAS FROM SAWDUST.

SPECIFICATION forming part of Letters Patent No. 321,868, dated July 7, 1885.

Application filed February 13, 1884. (No model.)

*To all whom it may concern:*

Be it known that I, GEORGE WALKER, a citizen of the United States, residing at Deseronto, in the Dominion of Canada, have invented new and useful Improvements in Apparatus for the Manufacture of Illuminating-Gas from Sawdust, of which the following is a specification.

This invention relates to improvements in that class of apparatus for carbonizing sawdust, in which the latter is delivered to a horizontal heated retort containing a worm or screw by which the material is caused to traverse the retort, and in its travel be carbonized and discharged at the end of the retort into a vessel arranged to receive it, the vapors and gases arising from the carbonizing material being conveyed by a pipe to a condenser.

The objects of my invention are to improve such apparatus, render the steps of the operations essentially automatic in their nature, utilize the incondensable gases arising from the heated sawdust, and render the same practically useful for illuminating and heating purposes, and for use in gas-engines for power, convey the carbonized material in the form of charcoal to a charcoal-main, and deliver it to an air-tight wheeled vehicle or car, by which it is transferred to the place desired.

These objects I accomplish in the manner and by the means hereinafter described and claimed, reference being had to the accompanying drawings, illustrating my invention, in which—

Figure 1 is a front elevation, partly in section, of an apparatus embodying my invention; Fig. 2, a rear elevation, partly in section, and Fig. 3, a longitudinal sectional detail view, partly in elevation.

In Figs. 1 and 2 of the drawings, I have shown a furnace and a bench of five retorts, and their concomitants arranged in the brick-work; but inasmuch as the number of retorts may be greatly varied, I deem it sufficient to describe my improvements in connection with a single retort, as in Fig. 3.

The number 1 indicates a retort of cast-iron or other suitable material—such as fire-clay— set horizontally in the brick-work of the furnace, to be heated by a suitable fire on the grate 2 of the fire-chamber 3, said retort connecting at its front end with the lower end of an upright conduit, 4, connecting at its upper portion with a feed-hopper, 5, into which the sawdust is automatically and uniformly delivered by a conveyer or feeder, consisting, as here shown, of a worm or screw, 6, rotating in a casing, 7, the sawdust being supplied to this conveyer or feeder in any appropriate manner. The feed-hopper and conduit contains a vertical shaft, 8, which is provided with radial arms 9, arranged in the hopper, and with a worm or screw, 10, arranged in the conduit, said shaft having a bevel gear-wheel, 11, at its upper end engaging a pinion, 12, on a horizontal rotating shaft, 13, whereby the vertical shaft is rotated, so that the material in the hopper is thoroughly loosened by agitation and by a worm or screw is delivered to the conveying worm or screw 14, extending horizontally through the retort, the front end of the shaft of such conveying-screw extending through a stuffing-box on the retort, and having a worm-wheel, 15, engaging a worm-gear, 16, on a horizontal rotating shaft, 17, all in such manner that the sawdust is caused to traverse the heated retort from front to rear.

The rear end of the retort is provided with a pendent tube, 18, connecting with a closed charcoal main or case, 19, arranged, as here shown, at right angles to the retort at the rear of the furnace brick-work, said main containing a revolving conveyer or worm, 20, by which the material passing through the pendent tube is conducted through the charcoal-main to any given or distant point, and discharged through an opening, 21, at the end of said main into a closed wheeled vehicle or car, 22, by which the material is transported to the place desired.

The rear end of the retort is also provided with a vertical pipe or tube, 23, connected at its upper portion with a vapor-receiving vessel or main, 24, which, as here shown, is arranged at right angles to the retorts at the rear upper portion of the furnace brick-work, and connects at one end by a pipe with the condenser 25. The condenser is composed of a series of copper tubes connected, respectively, by return-bends, and will, in practice, be arranged horizontally in a body of water contained in a suitable receptacle, and the outlet end of the lower or end pipe, 26, is provided with a bent or S-shaped trap-pipe, 27, said lower or end pipe, 26, connecting by a vertical tube, 28, with a gas-receiving chamber or conduit, 29, which will be connected with the usual exhauster, purifier, or scrubber employed in cleansing illuminating-gas, which apparatus I do not deem it necessary to illustrate.

The discharge-opening 21 in the charcoal-main 19 is controlled by a sliding valve, 30, operated by a suitable handle or lever, 31, connected with the valve-stem 32, the valve being arranged in suitable supporting-guides on the charcoal-main to open or close the discharge-opening, which latter is in the form of a pendent tubular neck, 32, adapted to loosely enter a groove, 33, provided around the edge of the receiving-mouth in the cover 34 of the wheeled vehicle or car when the latter has been properly brought beneath the tubular neck and then hoisted or lifted by any suitable mechanism—such, for example, as a rising and falling platform actuated by lever devices, as in Fig. 2. The valve is made to close the discharge-opening air-tight, and as the charcoal-main is otherwise air-tight, it may be said to be hermetically sealed when the valve is closed.

As the means for hoisting and lowering the car may be variously modified, I do not believe it requisite to more elaborately illustrate the same, and therefore do not confine myself to any special contrivances for accomplishing this purpose.

The cover 35 of the vehicle or car is flanged downward at its edges to enter grooves 36 around the upper edge of the car-body, and a suitable liquid, such as water, being supplied to the respective grooves, gas and air tight joints are provided to hermetically seal the parts when the discharge-valve of the charcoal-main is opened.

It will be seen that the retorts are uniformly and continuously fed with the sawdust without handling the material, and in its forced travel through the retort the sawdust is carbonized and delivered as charcoal in the charcoal-main through which the carbonaceous material is conveyed to the discharge-opening therein and delivered to the previously-elevated vehicle or car by opening the discharge-valve. The vapors and gases arising from the carbonized sawdust in the retort pass through the pipe or tube to the vapor-receiving vessel or main, and from thence pass to the condensing-tubes, the condensed vapors passing into the trap-pipe to form a seal, the bend of the trap-pipe being thus constantly filled with liquid and preventing the escape of the incondensible gas at this point, and necessarily compelling such gas to pass from the condenser through the tube to the gas-receiving chamber or conduit, by which it is conveyed through suitable connections to the exhauster, purifier, or scrubber, and after the passage through these it may be conveyed directly to the gas-holder and used for illuminating and heating purposes and for power without further treatment; or it may be enriched by the addition of a richer gas by any of the usual methods before passing to the holder. If essential, an exhauster—such as a steam-jet or a fan—may be employed to convey or force the gas from the retorts and the charcoal-main, and keep the retort free from pressure.

I have described the several conveyers as composed of worms or screws; but I do not confine myself to such particular conveyers; nor do I confine myself to any particular kind of valve for controlling the discharge of the charcoal into the air-tight car or vehicle.

When a series of retorts are used, as shown in Figs. 1 and 2, the agitators in all the hoppers as well as the conveyers in all the conduits will be operated by one power-shaft, and likewise the several conveyers in the retorts will be operated by one shaft; and, further, the charcoal-main is common to all the retorts, as is also the feed-hopper and the vapor-main.

By my invention I avoid handling the sawdust. In delivering it to the retort it is uniformly fed thereto. The charcoal is conveyed to the vessels or cars. The incondensable gas arising from the carbonization of the sawdust is utilized and rendered useful as a gas for illuminating or heating purposes, and the entire manipulations may be said to be automatic in that the only manual labor required is to start the fire in the furnace, operate the valve, and place and remove the charcoal-cars.

What I claim is—

1. In an apparatus for producing illuminating-gas, the combination of a charcoal or spent-material main, a screw-conveyer operating therein, a bottom valve-controlled neck formed on said main, and communicating with a discharge-opening therein, and a car or spent-material receiver having means to connect it in an air-tight manner with said neck, with a furnace, a retort set therein containing a rotary conveyer, a feed-hopper, devices for automatically delivering the material to the same, and devices operating in said feed-hopper for forcing the material into the retort-chamber, substantially as herein set forth.

2. An apparatus for producing illuminating-gas from sawdust, consisting, essentially, of a feeding-hopper having a forcing device for the material, a retort having a conveyer for carrying the material to the rear, and a second conveyer and an air-tight valve-controlled passage for the discharge of the spent material, a gas-main communicating with a condenser, substantially as herein set forth.

3. The combination, with the carbonizing-retort, of the charcoal-main having a discharge-opening in the form of a pendent neck, a conveyer for moving the carbonized material along the main, a valve controlling the discharge-opening, and a closed car or vehicle having means to connect it air-tight, with the tubular neck, substantially as described.

4. The combination, with the carbonizing retort, of the charcoal-main having a discharge-opening in the form of a pendent neck, a conveyer for moving the carbonized material to the discharge-opening, a valve controlling the latter, a closed vehicle or car having means to connect it air-tight, with the tubular neck, and devices to raise the vehicle or car, substantially as described.

In testimony whereof I have hereunto set my hand in presence of two subscribing witnesses.

GEORGE WALKER.

Witnesses:
EDWARD J. STOBO,
FRED. D. MOTT.